(12) United States Patent
Korhonen et al.

(10) Patent No.: US 12,078,218 B2
(45) Date of Patent: Sep. 3, 2024

(54) SILENT ELECTROMAGNETIC BRAKE

(71) Applicant: KONE Corporation, Helsinki (FI)

(72) Inventors: Tuukka Korhonen, Helsinki (FI); Jorma Mustalahti, Helsinki (FI)

(73) Assignee: KONE Corporation, Helsinki (FI)

( * ) Notice: Subject to any disclaimer, the term of this patent is extended or adjusted under 35 U.S.C. 154(b) by 412 days.

(21) Appl. No.: 16/796,443

(22) Filed: Feb. 20, 2020

(65) Prior Publication Data
US 2020/0300319 A1 Sep. 24, 2020

(30) Foreign Application Priority Data
Mar. 22, 2019 (EP) .................................... 19164573

(51) Int. Cl.
| | |
|---|---|
| *F16D 65/14* | (2006.01) |
| *F16D 55/226* | (2006.01) |
| *F16D 65/00* | (2006.01) |
| *F16D 65/18* | (2006.01) |
| *F16D 121/20* | (2012.01) |

(52) U.S. Cl.
CPC ......... *F16D 65/18* (2013.01); *F16D 55/2262* (2013.01); *F16D 65/0006* (2013.01); *F16D 2121/20* (2013.01)

(58) Field of Classification Search
CPC .. F16D 2121/22; F16D 59/02; F16D 2121/20; F16D 65/18; F16D 55/2262
See application file for complete search history.

(56) References Cited

U.S. PATENT DOCUMENTS

| | | | | |
|---|---|---|---|---|
| 3,512,618 | A | | 5/1970 | Schäfer |
| 3,763,968 | A | * | 10/1973 | Noly ....................... F16D 59/02 361/210 |
| 5,982,063 | A | * | 11/1999 | Lutz ..................... H02K 7/1023 310/77 |
| 7,059,453 | B2 | | 6/2006 | Yamamoto et al. |
| 2008/0314701 | A1 | * | 12/2008 | Bogelein ................ F16D 55/28 188/171 |
| 2017/0146079 | A1 | * | 5/2017 | Kanayama ............. F16D 55/30 |

FOREIGN PATENT DOCUMENTS

| | | | |
|---|---|---|---|
| DE | 102010017889 A1 * | 10/2011 | ............. F16D 65/18 |
| EP | 2 657 173 A1 | 10/2013 | |
| FR | 2855675 A1 * | 12/2004 | ............. F16D 63/00 |

OTHER PUBLICATIONS

Chinese Office Action and Search Report for Chinese Application No. 202010199014.6, dated Mar. 22, 2024, with English translation.

\* cited by examiner

*Primary Examiner* — Nicholas J Lane
*Assistant Examiner* — Stephen M Bowes
(74) *Attorney, Agent, or Firm* — Birch, Stewart, Kolasch & Birch, LLP

(57) ABSTRACT

An electromagnetic brake comprises an electromagnet arranged about a central axis SA; a slide movable with respect to the electromagnet in a slide actuation direction upon actuation of the electromagnet, and an air gap provided between the electromagnet and the slide through which a magnetic field passes when the electromagnet is actuated, wherein the slide is arranged radially inside or outside of the electromagnet with respect to the central axis SA. The electromagnetic brake is silent.

15 Claims, 9 Drawing Sheets

PRIOR ART

SILENT ELECTROMAGNETIC BRAKE

FIELD OF THE INVENTION

The present invention relates to a silent electromagnetic brake which can be used in a hoisting machine of an elevator, for example.

RELATED BACKGROUND ART

FIG. 8 shows a cross-sectional view of an electromagnetic brake 101 for a hoisting machine of an elevator according to the prior art. This electromagnetic brake 101 comprises an electromagnet having a coil 105 provided in a flange 102, and a spring 106 arranged in the center of the coil 105. The spring 106 presses a brake pad 107 against a braking surface (not shown) which is part of a hoisting motor, for example. The brake pad 107 is mounted to an armature 103 which is movable with respect to the flange 102 along a shaft 108 mounted to the flange 102. In the state of the brake pad 107 being pressed against the braking surface, there is an air gap 104 between the flange 102 and the armature 103. The electromagnet can provide an electromagnetic force when the coil 105 is excited so as to attract the armature 103 against the force of the spring 106. As a result, the brake 101 is opened with the air gap 104 becoming smaller. Finally, the armature 103 will abut on the flange 102 with the air gap 104 disappearing. The abutting action of the armature 103 on the flange 102 generates a noise which can be noticed by persons travelling in the elevator as disturbing.

One means for reducing this noise is to provide a damper spring which ensures a slower motion of the armature 103 resulting in that the abutting action of the armature 103 generates less noise. However, the provision of the damper spring requires that the magnetic force overcomes a higher spring force for opening the brake, i.e. the force of the damper spring in addition to force of the spring 106.

Thus, there is a need to provide an electromagnetic brake which can be operated without generating the above explained noise.

According to the present invention, the above need is achieved with an electromagnetic brake having the features of claim 1.

An electromagnetic brake according to the invention comprises an electromagnet arranged about a central axis; a slide movable with respect to the electromagnet in a slide actuation direction upon actuation of the electromagnet, and an air gap provided between the electromagnet and the slide through which a magnetic field passes when the electromagnet is actuated. The slide is arranged radially inside or outside of the electromagnet with respect to the central axis.

The above-mentioned central axis can be understood as being the central axis of the electromagnet.

Due to this arrangement, the electromagnet is arranged about a central axis. For example, the electromagnet can be ring-shaped about the central axis. However, the shape of the electromagnet is not limited to the ring shape and can have any shape which has a center such as a parallelogram, elliptic, a polygon and so on. Thus, the air gap, which is formed between the electromagnet and the slide, can extend in a direction substantially parallel to the central axis. As a result, when the slide moves in the slide actuation direction, the distance between the slide and the electromagnet with respect to a direction perpendicular to the center axis remains constant. As a result, although the slide can move, the slide will never abut on the electromagnet in a manner explained above with reference to FIG. 8 such that a noise accompanied by the abutment of the slide with the electromagnet can be avoided. Also, the electromagnetic brake can be configured in a manner that the slide will not abut on other structural members of the electromagnetic brake. Hence, an electromagnetic brake which is silent by nature can be obtained.

In one embodiment, the slide is arranged radially inside the electromagnet and the electromagnet is arranged radially outside the slide. Alternatively, the slide can be arranged radially outside the electromagnet and the electromagnet can be arranged radially inside the slide.

Preferably, the slide comprises ferromagnetic material, such as iron, for example. This allows the slide or a part of the slide being used as a part of a magnetic circuit of the electromagnet.

Preferably, the electromagnet and the slide are ring-shaped, respectively. This allows a simple configuration which is easy to manufacture.

Preferably, the electromagnet comprises a coil wound about the central axis and adapted to generate a magnetic field upon excitation. Also preferably, the electromagnetic brake comprises magnetic field adaptation means for adapting the magnetic field so as to generate a magnetic force acting on the slide in the slide actuation direction.

The magnetic field adaptation means adapts the magnetic field in a manner that the slide can be moved with respect to the electromagnet in a manner not moving the electromagnet but in parallel to the electromagnet.

Preferably, the magnetic field adaptation means comprises at least one electromagnet projection projecting from the electromagnet into the air gap, and at least one slide projection projecting from the slide into the air gap. The provision of the projections allows to have a suitable structure for providing the magnetic field adaptation means which can be easily manufactured.

Preferably, the electromagnet projection and the slide projection are offset from each other in the slide actuation direction in the state of the electromagnet not being actuated. Since the projections are offset from each other in the state of the electromagnet not being actuated, when the magnetic field is generated due to actuation of the electromagnet, electromagnetic forces are generated between the projections which are offset from each other such that the projection of the slide will be attracted by the projection of the electromagnet with a magnetic force corresponding to the amount of electric current supplied to the electromagnet. As a result, the slide can move in the slide actuation direction.

Preferably, the electromagnet projection comprises an inclined surface on the side facing in the slide actuation direction, and the slide projection comprises an inclined surface on the side facing opposite to the slide actuation direction. The inclined surfaces are inclined with respect to the direction perpendicular to the slide actuation direction. The inclined surfaces improve the adaptation of the magnetic field in a manner to more suitable generate the magnetic forces which make the projections attract each other.

Preferably, a permanent magnet is provided parallel to the electromagnet. The permanent magnet provides a permanent magnetic field which combines with the magnetic field of the electromagnet when the latter is actuated. The permanent magnet decreases the needed magnetization/actuation of the electromagnet for making the slide move. Hence, the permanent magnet ensures a magnetic force which is sufficient for moving the slide. As a result, the size of the coil of the electromagnet can be reduced such that the electromagnetic brake can be manufactured at lower cost.

Preferably, the electromagnetic brake comprises guiding means for guiding the slide in the slide actuation direction. The guiding means secure that the slide moves along the slide actuation direction in a manner without decreasing the distance between the slide and the electromagnet with respect to the direction perpendicular to the center axis. As a result, it can be ensured that the slide will never come into contact with the electromagnet at any position. This ensures the natural noiselessness of the electromagnetic brake.

Preferably, the electromagnetic brake further comprises at least one spring for urging the slide opposite to the slide actuation direction. The at least one spring allows to bring the slide either into the position of the brake being closed or into the position of the brake being opened.

Preferably, the electromagnetic brake comprises a friction member connected to the slide and being adapted to be pressed against a braking surface. Preferably, the slide actuation direction is the direction in which the slide is moved so as to press the friction member against the braking surface. This allows to have a spring loaded electromagnetic brake, which is closed when the electromagnet is not activated. Alternatively, the slide actuation direction is the direction in which the slide is moved so as to move the friction member away from the braking surface. This allows to have a spring loaded electromagnetic brake, which is opened when the electromagnet is not activated.

Preferably, the electromagnetic brake is adapted to be applied to a transportation system such as an elevator, an escalator or a moving walkway. Preferably, the electromagnetic brake is adapted to be applied to a hoisting machine, wherein the electromagnetic brake may be attached to a framework of the hoisting machine to brake a shaft and/or a traction sheave of the hoisting machine. However, the electromagnetic brake is not limited to these applications and it can be applied in any technical field in which it is desired to an electromagnetic brake which is silent by nature.

Preferably, the slide comprises a plurality of blind holes each for receiving one of a plurality of springs.

Preferably, the slide comprises a plate-shaped slide portion and a spring is coaxially provided with respect to the electromagnet so as to urge the plate-shaped slide portion opposite to the slide actuation direction.

Preferably, at least two sets of an electromagnet and a slides are provided. In this case, each electromagnet is arranged about its own central axis such that the electromagnetic brake comprises as many central axis as sets of electromagnet and slide.

DESCRIPTION OF THE EMBODIMENTS

These and other objects, features and advantages will become more fully apparent from the following detailed description of embodiments of the present invention which is to be taken in conjunction with the appended drawings, in which:

FIG. 1 is a schematic cross-sectional view of an electromagnetic brake according to a first embodiment of the invention, FIG. 2 shows the magnetic field when the coil is not excited, FIG. 3 shows the magnetic field when the coil is excited, FIG. 4 is a chart showing the relation between a moving position of the slide and forces of a spring and an electromagnet, respectively, and FIG. 5 is a schematic cross-sectional view of an electromagnetic brake according to a second embodiment of the invention.

FIRST EMBODIMENT

Figure 1:
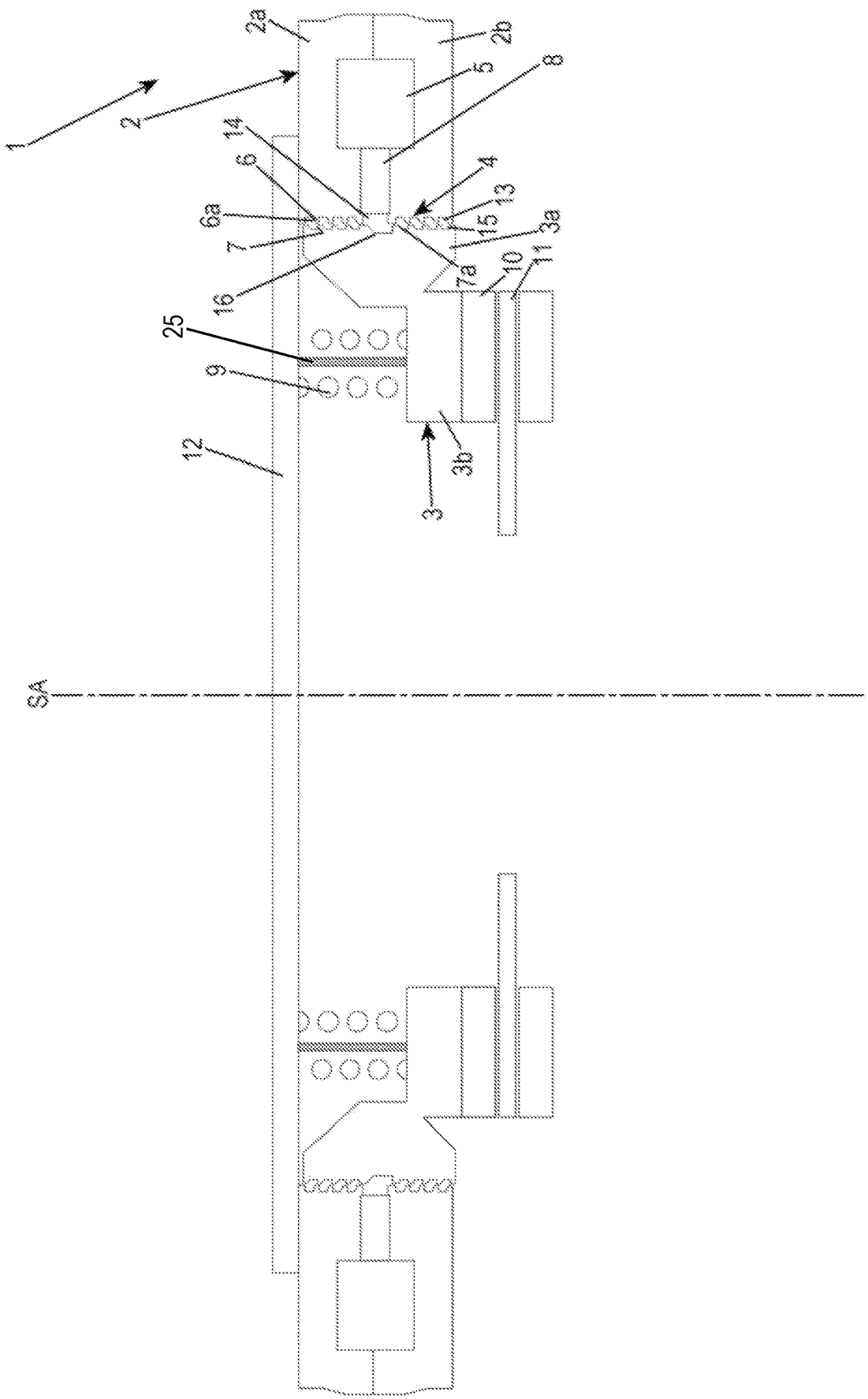

An electromagnetic brake 1 according to the first embodiment of the invention, as is shown in FIG. 1, comprises a ring-shaped flange 2 made from steel such as S355, a ring-shaped coil 5 provided inside the flange 2, and a slide 3 provided radially inside of the flange 2.

The flange 2 is mounted to a support 12, for example a housing of the electromagnetic brake 1, which can be mounted to a hoisting machine (not shown) of an elevator, for example. The flange 2 is ring-shaped about a central axis SA.

The coil 5 is placed inside the flange 2 and is also ring-shaped about the central axis SA. The coil 5 comprises windings (not shown) which are oriented on a substantially circular path about the central axis SA. Since the coil 5 is the main constituent member of the electromagnet, the electromagnet according to the present invention is arranged about the central axis SA. In other words, the central axis is defined by the coil 5 and thus by the electromagnet.

A ring-shaped permanent magnet 8 is provided inside the flange 2 at a position between the coil 5 and the slide 3 and thus parallel to the electromagnet.

In this embodiment, the flange 2 is constituted by an upper part 2a and a lower part 2b between which the coil 5 and that permanent magnet 8 are provided.

The slide 3 has a ring-shaped slide portion 3a and a plate-shaped slide portion 3b, which is connected to a bottom portion of the ring-shaped flange portion 3a. The slide 3 is substantially symmetric with respect to the center axis SA.

A friction pad 10 is mounted to the bottom portion of the plate-shaped slide portion 3b. The friction pad 10 can be brought into contact with a braking surface of a brake disc 11 when the slide 3 is moved downwardly in FIG. 1 and thus towards the brake disc 11.

A plurality of springs 9 are provided between the support 12 and the slide 3 so as to urge the slide 3 towards the brake disc 11. The springs 9 can be coil springs and can be evenly distributed along the circumferential extension of the slide 3. Preferably, four springs 9 are provided but the number is not limited to four.

Projections 7 are formed on a radially outer side of the ring-shaped slide portion 3a. Each of the projections 7 is ring-shaped and has a cross-sectional shape with an upper straight line perpendicular to the center axis SA, an outer straight line parallel to the center axis SA and a lower straight line extending in an inclined manner downwardly towards the ring-shaped slide portion 3a. The lower straight line in the cross-sectional view corresponds to an inclined surface 7a of the projection 7 which is inclined with respect to the direction perpendicular to the slide actuation direction. The upper straight line and the radially outer straight line correspond to ring-shaped surfaces of the projections 7. In the first embodiment, the slide 3 comprises ten projections 7.

Thus, a recess 15 is formed between two adjacent projections 7. With ten projections 7, the slide 3 comprises nine recesses. The upper four recesses 15 and the lower four recesses 15 have the same depth in the direction perpendicular to the center axis SA. A middle recess 16 is formed between the two projections 7 which are placed in the middle part of the slide 3 with respect to the direction of the center axis SA. In other words, when numbering the projections 7 from the bottom side to the top side of the slide 3, the middle recess 16 is formed between the projections 7 with numbers five and six, and is deeper that the other recesses 15 with respect to the direction perpendicular to the center axis SA and larger than the other recesses 15 in the direction of the center axis SA. Further, the middle recess 16 is longer than the other recesses in the direction of the center axis SA.

Projections 6 are formed on a radially inner side of the flange 2. Each of the projections 6 is ring-shaped and has a cross-sectional shape with a lower straight line perpendicular to the center axis SA, an outer straight line parallel to the center axis SA and an upper straight line extending in an inclined manner upwardly towards the flange 2. The upper straight line in the cross-sectional view corresponds to an inclined surface 6a of the projection 6 which is inclined with respect to the direction perpendicular to the slide actuation direction. The lower straight line and the radially inner straight line correspond to ring-shaped surfaces of the projections 7. In the first embodiment, the flange 2 comprises ten projections 6.

Thus, a recess 13 is formed between two adjacent projections 6. With ten projections 6, the flange 2 comprises nine recesses. The upper four recesses 13 and the lower four recesses 13 have the same depth in the direction perpendicular to the center axis SA. A middle recess 14 is formed between the two projections 6 which are placed in the middle part of the flange 2 with respect to the direction of the center axis SA. In other words, when numbering the projections 6 from the bottom side to the top side of the flange 2, the middle recess 14 is formed between the projections 6 with numbers five and six, and is deeper than the other recesses 13 in the direction perpendicular to the center axis SA. Further, the middle recess 14 is deeper longer than the other recesses 13 in the direction of the center axis SA. The bottom of the middle recess 14 of the flange 2 is formed by the radially inner surface of the permanent magnet 8.

An air gap 4 is provided between the radial inner side of the flange 2 and the radial outer side of the slide 3. In the cross-sectional view of FIG. 1, the air gap substantially extends in the direction parallel to the center axis SA. In fact, the air gap 4 is defined by the surfaces of the projections 6 of the flange 2, the surfaces of the recesses 13, 14 between these projections 6, the surfaces of the projections 7 and the surfaces of the recesses 15, 16 between these projections 7. Hence, the length of the air gap 4 in the direction perpendicular to the center axis SA is larger at a first section perpendicular to the center axis SA, which goes through a recess 13 of the flange and a recess 15 of the slide 3, than that at a second section perpendicular to the center axis SA, which goes through a projection 6 of the flange 2 and a projection 7 of the slide 3.

Figure 2:
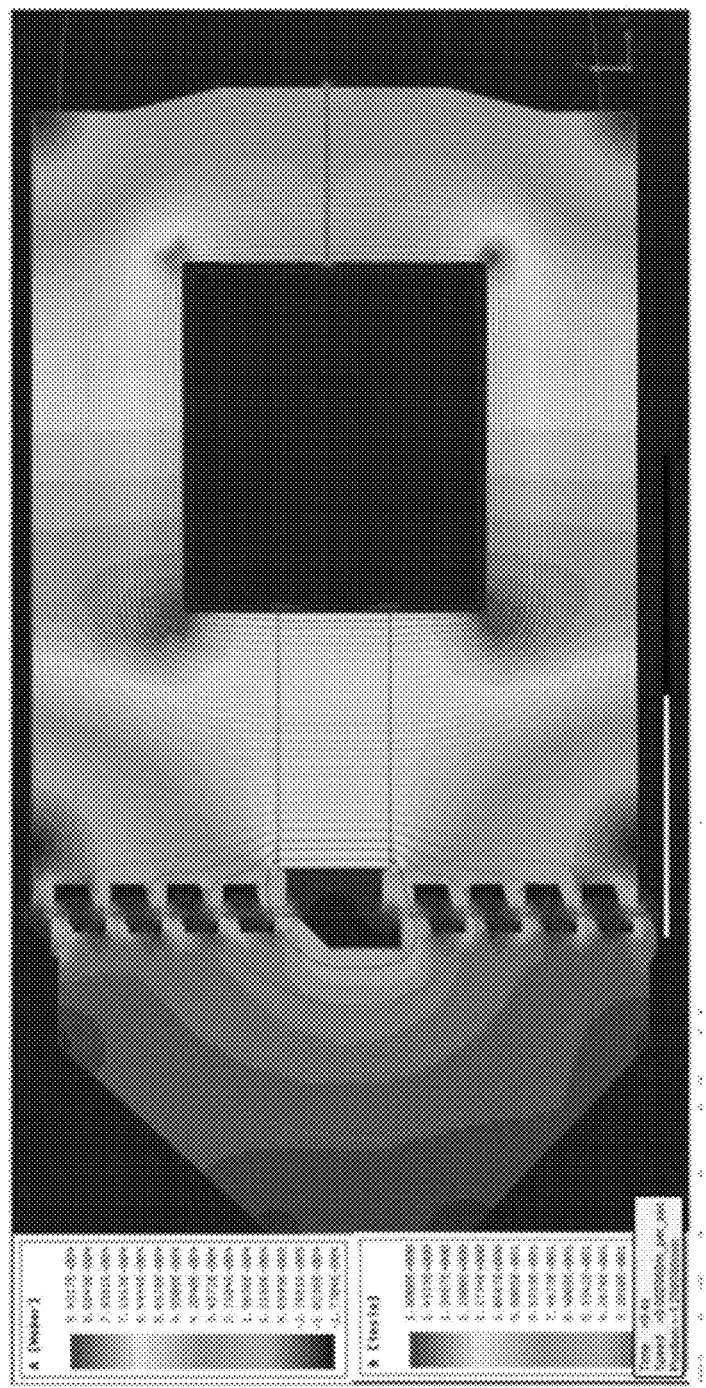

FIG. 2 shows the magnetic field in the flange 2 and the ring-shaped portion of the slide 3 in the state of the coil 5 not being excited. In this state, the magnetic field is generated only by the permanent magnet 8 and the magnetic field is going around the coil 5. Hence, the magnetic flux density in the region of the air gap is as small that it does not generate a magnetic force which would overcome the spring force of the spring 9. As a result, the electromagnetic brake 1 is in the closed state in which the friction pad 10 is pressed against the braking surface of the disc 11 by the spring force of the spring 9. In this closed position, the slide 3 is offset from the flange 2 in the direction of the center axis SA, towards the braking surface of the brake disc, such that the projections 7 of the slide 3 are accordingly offset from the projections 6 of the flange 2.

Figure 3:
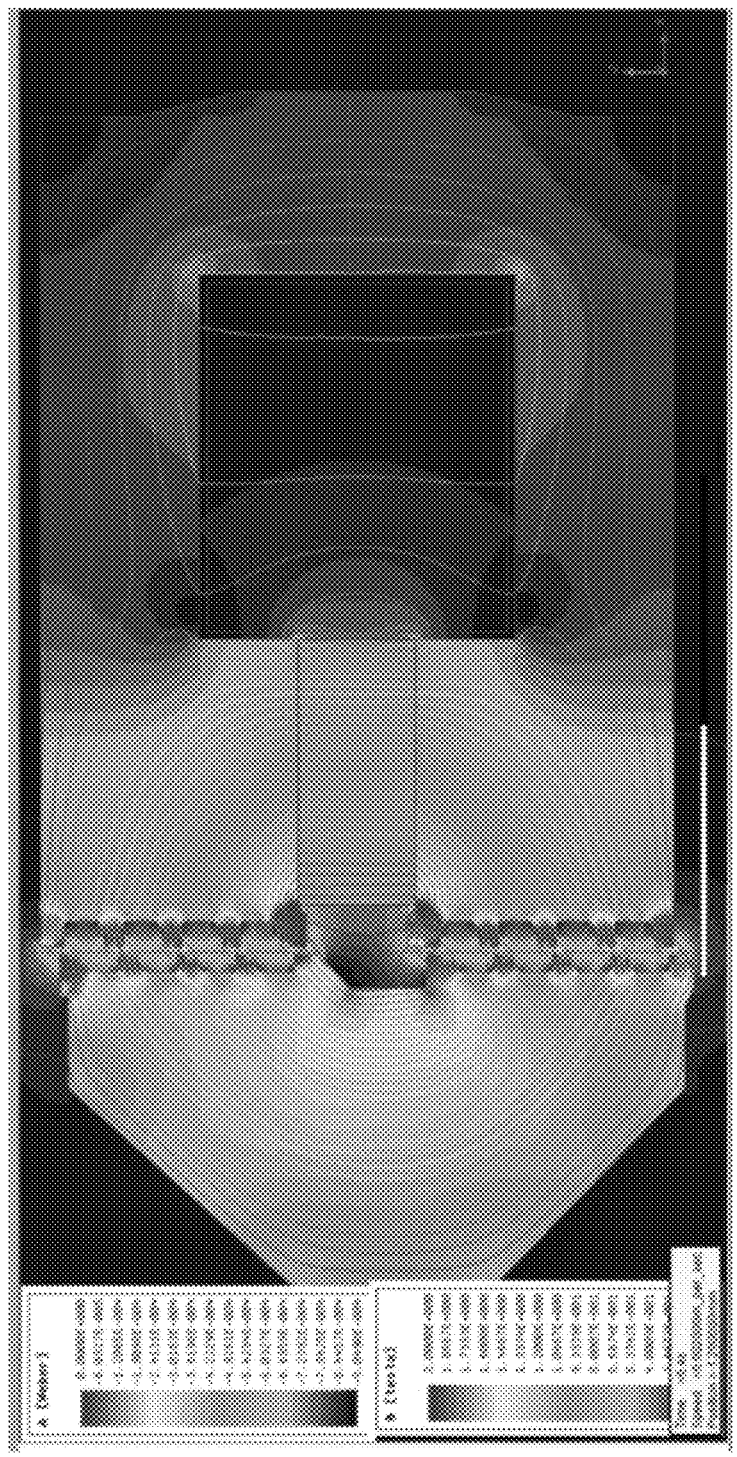

When the coil 5 is excited, the magnetic field of the permanent magnet 8 and that of the excited coil 5 go through the ring-shaped portion of the slide 3. As is shown in FIG. 3, the magnetic flux density is especially high in the region where the projections 6 and 7 are close to each other where a portion of the air gap 4 formed between the flange 2 and the slide 3 is narrow. The magnetic field generated in the projections 6 and 7 generate attraction forces between the flange 2 and the slide 3 which have a force component in a slide actuation direction which is directed away from the brake disk 11. Since the slide 3 is guided by guiding means to slide in the slide actuation direction, the slide 3 is hindered from being moved in the direction perpendicular to the slide actuation direction. The guiding means can be guiding rods on which the slide 3 is mounted via sliding bearings, for example. An example of the guiding rods 25 are illustrated in FIG. 1.

Figure 4:
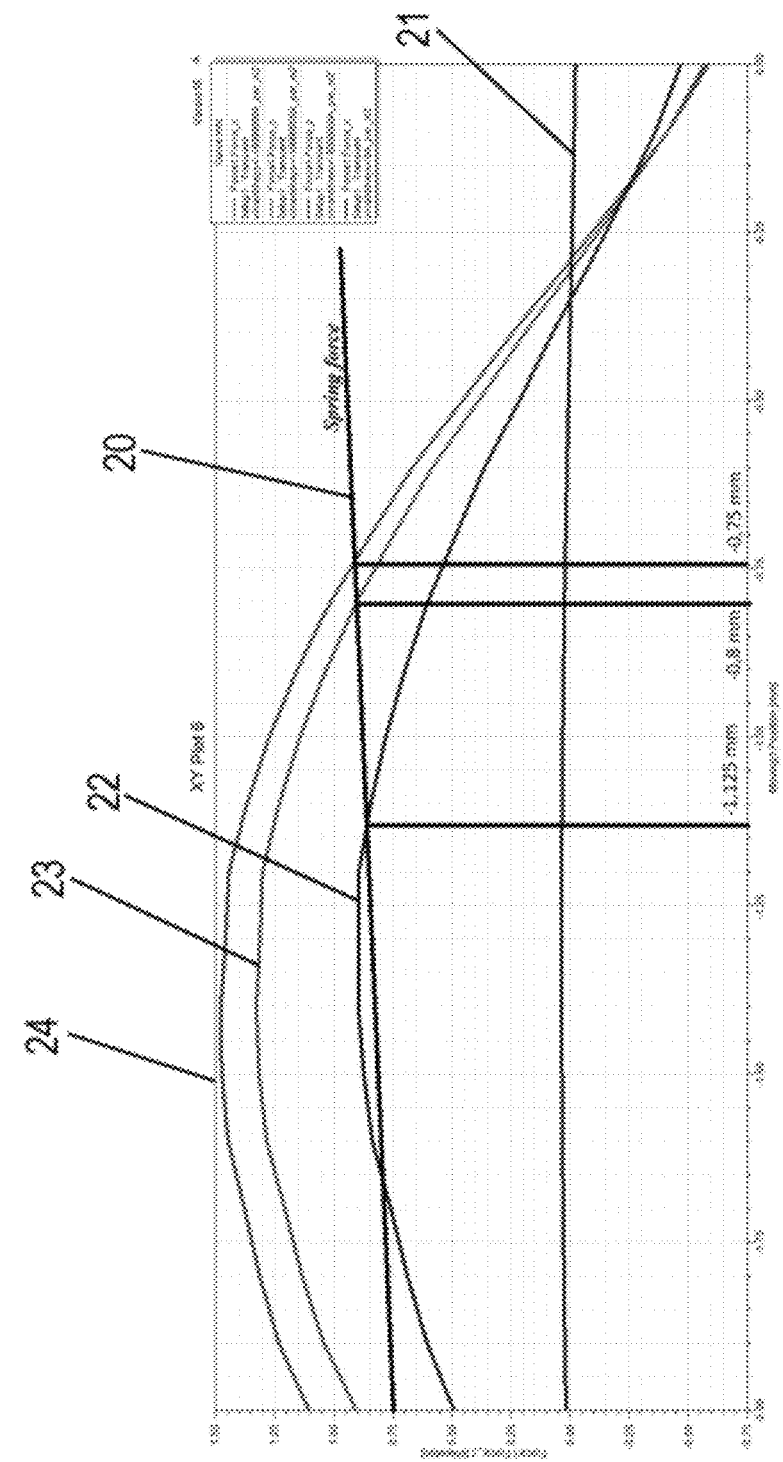

FIG. 4 shows a spring force curve 20 and magnet force curves 21 to 24 which curves indicate relations between the respective forces (vertical axis) and the associated moving position (horizontal axis) of the slide 3. The moving position −2.00 mm corresponds to the position in which the slide 3 is offset with respect to the flange 2 to the largest amount in a manner that the projections do not overlap each other at all. In the present embodiment, the brake is closed at moving position −1.25 mm. The moving position 0.00 mm corresponds to the position in which the brake 1 is fully open, i.e. projections 6 of the slide 3 are aligned with the projections 7 of the flange 2. In this position, the slide 3 has been moved in the slide actuation direction away from the brake disc 11 to the largest amount.

The spring force curve 20 is substantially linear. The magnet force curves 21 to 24 are non-linear because the magnetic force is exponentially proportional to the air gap length in the magnetic circuit. The air gap length in the magnetic circuit changes when the position of the slide changes with the result that the offset between the projections 6, 7 decreases such that the projections 6, 7 align with each other to a larger extent.

Magnet force curve 21 shows the state that no current is supplied to the coil 5. In this state, the current density (Finnish term "Virrantiheys" in FIG. 4) is zero and the generated magnet force is substantially zero.

Magnet force curve 22 shows the state that the coil 5 is excited with a current density of 5 000 000 A/m$^2$. The magnet force curve 22 intersects the spring force curve 20 at position −1.125 mm. At this position, the projections 6, 7 are aligned to a larger extent compared to the state of the coil 5 not being excited and the slide 3 being positioned at −2.00 mm. Hence, the air gap 4 has become smaller.

Magnet force curve 23 shows the state that the coil 5 is excited with a current density of 10 000 000 A/m$^2$. The magnet force curve 23 intersects the spring force curve 20 at position −0.8 mm. At this position, the projections 6, 7 are aligned to a larger extent compared to the state of the coil 5 being excited with a current density of 5 000 000 A/m$^2$ and the slide 3 being positioned at −1.125 mm. Hence, the air gap 4 has become even smaller.

Magnet force curve 24 shows the state that the coil 5 is excited with a current density of 15 000 000 A/m². The magnet force curve 24 intersects the spring force curve 20 at position −0.75 mm. At this position, the projections 6, 7 are aligned to larger extent compared to the state of the coil 5 being excited with a current density of 10 000 000 A/m² and the slide 3 being positioned at −0.8 mm. Hence, the air gap 4 has become even smaller.

Thus, it can be understood that the position of the slide 3 will be on the crossing point of the electromagnetic force corresponding to the applied current density and spring force, and by controlling the current density, i.e. the current supplied to the coil 5, the slide 3 will move. During the movement of the slide 3, the projections 6, 7 become more and more aligned with each other. As has been explained above, the air gap 4 is formed between the projections 6, 7 and the recesses 13, 14, 15, 16, respectively. In the region where recesses 13, 14, 15, 16 oppose each other, the air gap is larger than in the region where the projections 6, 7 oppose each other. Hence, when the slide 3 is moving in the slide actuation direction, the proportion of the projections 6, 7 opposing each other with respect to proportion of the recesses 13, 14, 15, 16 opposing each other becomes larger. As a result, the air gap 4 becomes smaller when the slide 3 moves in the slide direction to open the brake 1.

Second Embodiment

Figure 5:
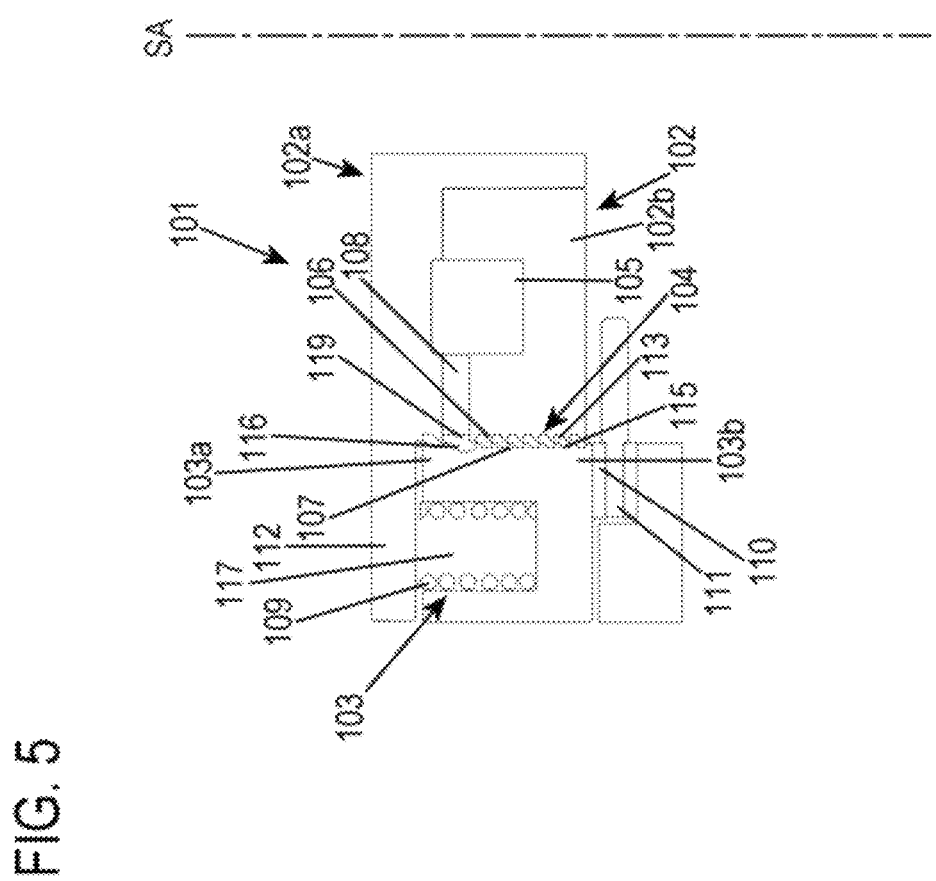

FIG. 5 shows an electromagnetic brake 101 according a second embodiment of the present invention. The members of this electromagnetic brake have been referenced with reference signs which are obtained by adding 100 to the reference signs used in the first embodiment. In the following, only the major differences with respect to the first embodiment as described.

In the second embodiment, the slide 103 is provided radially outside of the flange 102 and comprises blind holes 117 for receiving springs 109. Although only two blind holes 117 are shown in FIG. 5, a plurality of blind holes 117 and a corresponding number of springs 109 can be provided over the circumferential extension of the slide 103. Preferably, there are four blind holes 117 and four springs 109 equally distributed over the circumferential extension.

Furthermore, in the present embodiment, the flange 102 is formed by an upper part 102a and a lower part 102b with the coil 105 and the permanent magnet 108 provided between these parts 102a, 102b. In this embodiment, the upper part 102a is integrally formed with the support 112.

Also, the distribution of the projections 106, 107 is different from that of the projections 6, 7 of the first embodiment. In the present embodiment, seven projections 106 having an inclined surface 106a are formed in the lower part 102b of the flange 102 and one projection 106 having an inclined surface 106a formed in the upper part 102a. A corresponding number of projections 107 is formed in the slide 103 below and above the recess 116, respectively. Apart from that, the mode of operation is substantially the same as that of the first embodiment.

Third Embodiment

Figure 6A:
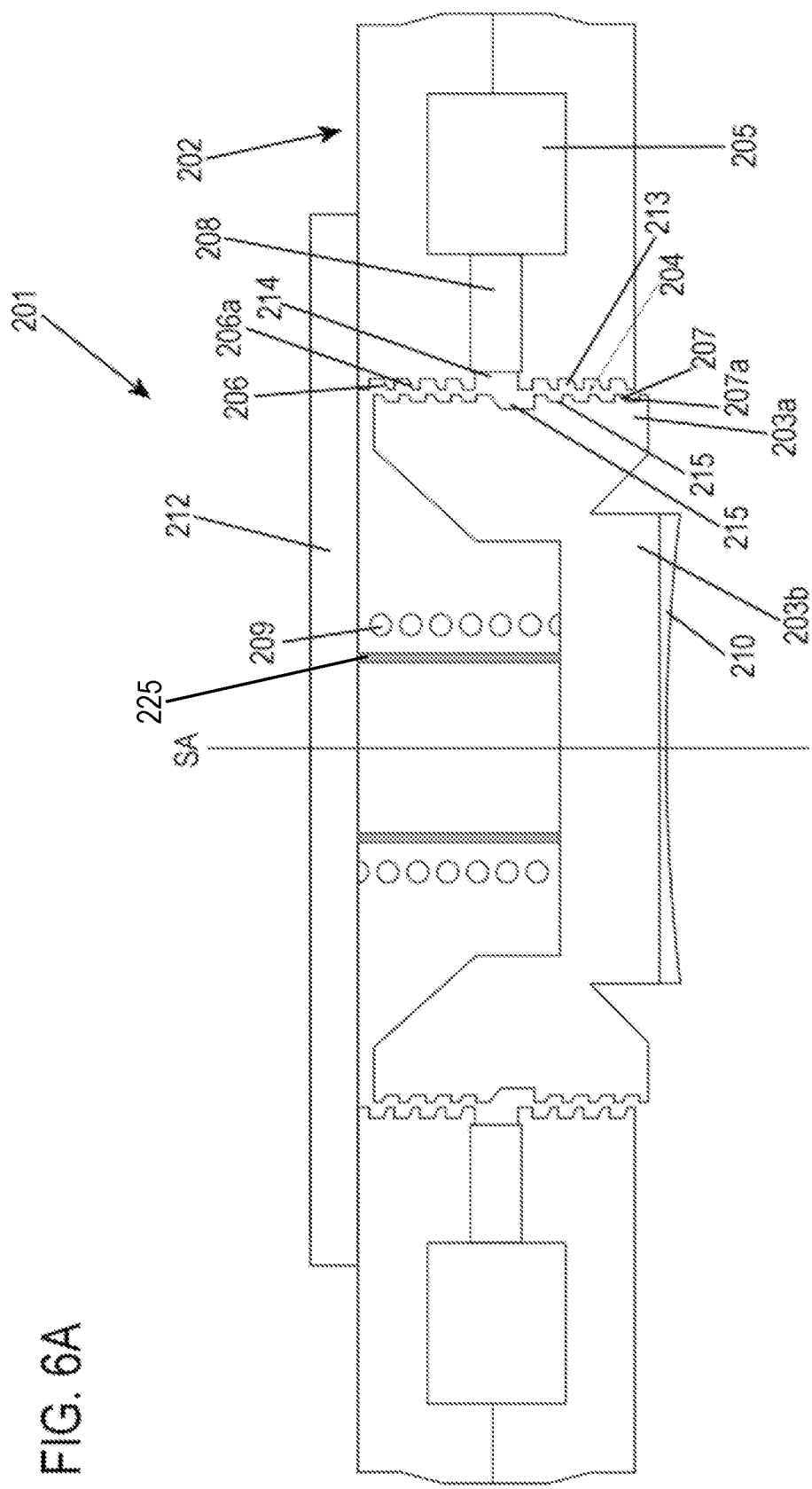
FIG. 6A is a schematic cross-sectional view of an electromagnetic brake according to a third embodiment of the invention in a state where the brake is engaged.
Figure 6B:
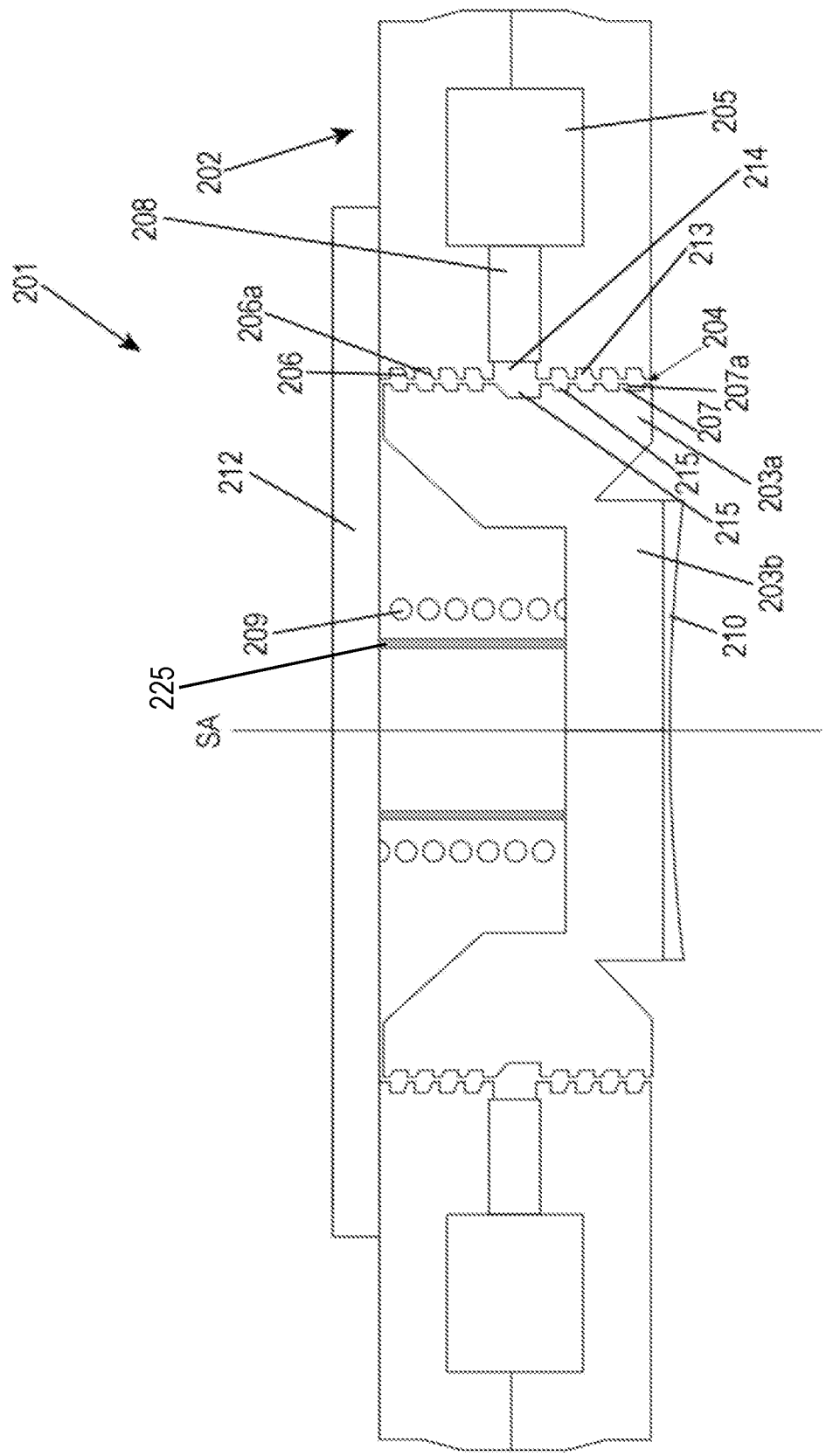
FIG. 6B is a schematic cross-sectional view of the electromagnetic brake according to the third embodiment of the invention in a state where the brake is open.

FIGS. 6A and 6B show an electromagnetic brake 201 according a third embodiment of the present invention. The members of this electromagnetic brake have been referenced with reference signs which are obtained by adding 200 to the reference signs used in the first embodiment. In the following, only the major differences with respect to the first embodiment as described.

The electromagnetic brake 201 according to this embodiment has a more compact structure compared to that of the first embodiment. While the plate-shaped slide portion 3b according to the first embodiment has a central bore, the plate-shaped slide portion 203b according to the third embodiment does not have such a bore but is formed like a continuous plate. In this embodiment, guiding rods 225 may be provided, as illustrated in FIGS. 6A and 6B.

Furthermore, the electromagnetic brake 201 according to this embodiment comprises only a single spring 209 which is provided between the support 212 and the plate-shaped slide portion 203b for urging the slide 203 away from the support 212, i.e. opposite to the slide actuation direction. This single spring 209 is provided substantially coaxial to the ring-shaped slide portion 203a. In other words, the central axis of the spring 209 corresponds to the central axis of the slide and that of the electromagnet.

Also, the electromagnetic brake 201 according to this embodiment is configured to apply a braking force to the outer circumferential surface of a traction sheave of a hoisting machinery. For this reason, the friction pad 210 has a curved surface on the side facing away from the plate-shaped slide portion 203b with a curvature corresponding to the curvature of the outer circumferential surface of the traction sheave of the hoisting machinery.

Fourth Embodiment

Figure 7:
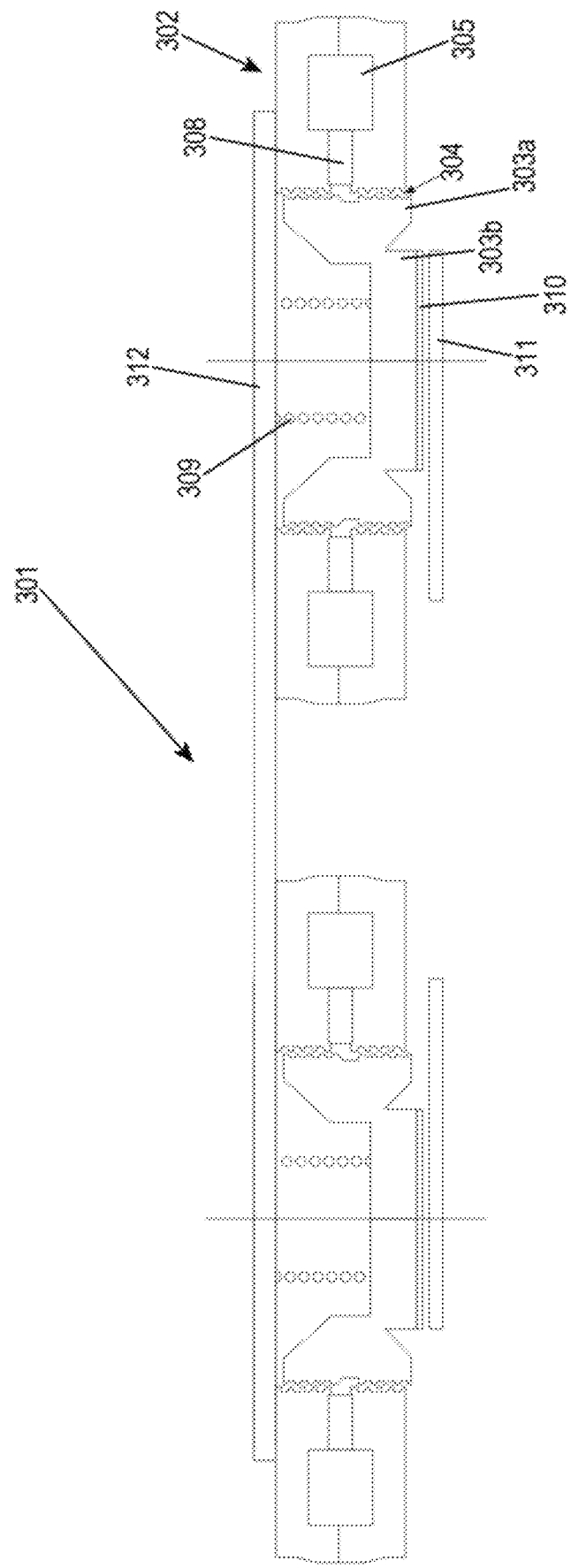
FIG. 7 is a schematic cross-sectional view of an electromagnetic brake according to a fourth embodiment of the invention.

FIG. 7 shows an electromagnetic brake 301 according a third embodiment of the present invention. The members of this electromagnetic brake have been referenced with reference signs which are obtained by adding 300 to the reference signs used in the first embodiment. In the following, only the major differences with respect to the third embodiment as described.

The electromagnetic brake 301 according to this embodiment comprises two sets of a flange 302 and a slide 303 having the structures of those of the third embodiment, respectively. Furthermore, each of the slides 303 is urged by a single spring 312 as in the third embodiment. Other than the curved surface of the friction pad 210 of the third embodiment, each of the friction pads 310 of the fourth embodiment has a flat surface on the side facing away from the plate-shaped slide portion 303b since this electromagnetic brake 301 is applied to a brake disc 311.

Figure 8:
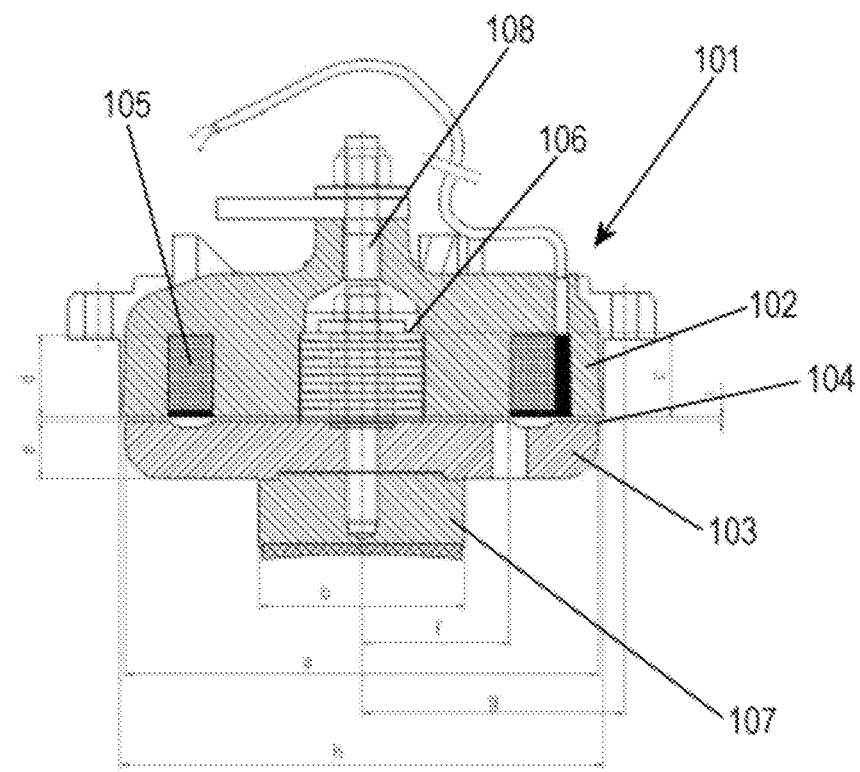
FIG. 8 is a schematic cross-sectional view of a conventional electromagnetic brake.

With the electromagnetic brakes according to the embodiments, the slide can be moved against the spring force of the spring while the air gap remains always between the slide and the flange. Hence, since the slide never comes into abutment with the flange, the noise generated by abutment between the flange and the armature as in the conventional electromagnet brake shown in FIG. 8, will not be generated. Thus, the electromagnetic brake according to the embodiments is silent by nature.

Dropping/closing of the electromagnetic brake is also silent by nature because the slide moves in proportion to the current density of the coil. Making reference to FIG. 4, the slide position can be set by the crossing points of the magnetic force curve and of the spring force curve assumed that there would be no friction losses and that the mass of the slide is considered negligible. Thus, by decreasing the current of the coil accordingly, the brake may be closed silently.

Furthermore, in the embodiments, there is also an air gap between the upper portion of the slide and the support. When the electromagnetic brake is operated, this air gap above the slide changes with in the direction of the center axis as can best be understood from FIGS. 6A and 6B. However, this air gap can be dimensioned such that, when the electromagnetic brake is operated (see for example FIG. 6B), the slide does not abut the support. Also for this reason, the electromagnetic brake according to the embodiments is silent by nature.

Furthermore, the structure of the electromagnet brake according to the embodiments is simpler and thus requires less maintenance.

The present invention is not limited to the above embodiments and can be modified as follows.

The electromagnetic brake according to the embodiments is of the configuration in which the slide is urged by the spring against the brake disc into the closed position. However, the invention can be applied to an electromagnetic brake in which the slide is urged by a spring away from the brake disc into the opened position and the electromagnet is configured to move the slide against the spring force in a slide actuation direction towards the brake disc upon actuation of the electromagnet.

The electromagnetic brake according to the embodiments has the permanent magnet which is provided between the coil and the slide. The permanent magnet ensures an opening force of the electromagnet and allows to decrease the size of the coil. However, the permanent magnet can be omitted for example for applications which do not require a large brake force such that the spring force is smaller and thus the required magnetic force for opening the brake is smaller. Alternatively, the coil can be made larger in case the permanent magnet is omitted.

In the first, second and fourth embodiment, the invention is applied to a brake disc. However, the invention can be applied to other types of brakes which require that a friction pad is moved for providing a braking action such as the brake of the third embodiment. Hence, the configuration of the first, second and fourth embodiment can be applied to a brake in which a curved friction pad is applied to the circumference of a rope disc, and the configuration of the third embodiment can be applied to a brake disc.

In the embodiments, the inclined surfaces of the electromagnet projections and of the slide projections are straight surfaces. However, these surfaces may instead be curved surfaces.

The invention claimed is:

1. An electromagnetic brake comprising:
an electromagnet arranged about a central axis;
a slide movable with respect to the electromagnet in a slide actuation direction upon actuation of the electromagnet; and
an air gap provided between the electromagnet and the slide through which a magnetic field passes when the electromagnet is actuated, wherein
the slide is arranged radially inside or outside of the electromagnet with respect to the central axis,
the electromagnet comprises a coil wound about the central axis such that the coil surrounds the air gap in a plane transverse to the central axis, the coil being adapted to generate the magnetic field upon excitation,
the electromagnetic brake further comprises a magnetic field adaption device for adapting the magnetic field so as to generate a magnetic force acting on the slide in the slide actuation direction,
the magnetic field adaption device comprises
an electromagnet projection projecting from the electromagnet into the air gap; and
a slide projection projecting from the slide into the air gap, and
the electromagnet projection and the slide projection are offset from each other in the slide actuation direction in the state of the electromagnet not being actuated.

2. The electromagnetic brake according to claim 1, wherein
the electromagnet and the slide are both ring-shaped.

3. The electromagnetic brake according to claim 2, further comprising
a permanent magnet provided parallel to the electromagnet.

4. The electromagnetic brake according to claim 1, wherein
the electromagnet projection comprises an inclined surface on the side facing in the slide actuation direction, and
the slide projection comprises an inclined surface on the side facing opposite to the slide actuation direction, wherein
the inclined surfaces are inclined with respect to the direction perpendicular to the slide actuation direction.

5. The electromagnetic brake according to claim 4, further comprising
a permanent magnet provided concentrically aligned with the electromagnet.

6. The electromagnetic brake according to claim 1, further comprising
a permanent magnet provided concentrically aligned with the electromagnet.

7. The electromagnetic brake according to claim 1, further comprising
guiding means for guiding the slide in the slide actuation direction.

8. The electromagnetic brake according to claim 7, further comprising
a permanent magnet provided concentrically aligned with the electromagnet.

9. The electromagnetic brake according to claim 1, further comprising
at least one spring for urging the slide opposite to the slide actuation direction.

10. The electromagnetic brake according to claim 9, wherein the at least one spring comprises a plurality of springs, and the slide comprises a plurality of blind holes each for receiving one of the plurality of springs.

11. The electromagnetic brake according to claim 9, wherein the slide comprises a plate-shaped slide portion and the at least one spring is coaxially provided with respect to the electromagnet so as to urge the slide opposite to the slide actuation direction.

12. The electromagnetic brake according to claim 1, further comprising
a friction member connected to a surface of the slide and being adapted to be pressed against a braking surface, the surface of the slide and the braking surface being substantially orthogonal to the central axis, wherein
the slide actuation direction is the direction in which the slide is moved so as to press the friction member against the braking surface, or the slide actuation direction is the direction in which the slide is moved so as to move the friction member away from the braking surface.

13. The electromagnetic brake according to claim 1, wherein the electromagnetic brake is adapted to be applied to a transportation system.

14. The electromagnetic brake according to claim 1, wherein the electromagnetic brake is adapted to be applied to a hoisting machine.

15. The electromagnetic brake according to claim 1, wherein
   the electromagnet comprises at least two sets of an electromagnets and at least two slides.

\* \* \* \* \*